H. C. ATWOOD.
TIRE PATCH.
APPLICATION FILED NOV. 6, 1916.

1,268,536.

Patented June 4, 1918.

WITNESSES

INVENTOR
HARRY C. ATWOOD
BY
ATTORNEYS

UNITED STATES PATENT OFFICE.

HARRY C. ATWOOD, OF MINNEAPOLIS, MINNESOTA, ASSIGNOR TO DURKEE-ATWOOD CO., OF MINNEAPOLIS, MINNESOTA, A CORPORATION.

TIRE-PATCH.

1,268,536.

Specification of Letters Patent.  Patented June 4, 1918.

Application filed November 6, 1916. Serial No. 129,725.

*To all whom it may concern:*

Be it known that I, HARRY C. ATWOOD, a citizen of the United States, resident of Minneapolis, county of Hennepin, State of Minnesota, have invented certain new and useful Improvements in Tire-Patches, of which the following is a specification.

My invention relates to a patch for repairing the inner tube of a pneumatic tire.

The object of the invention is to provide a patch of such construction that there will be no possibility of air escaping from the tire through the patch.

A further object is to provide a tire patch which can be easily and quickly applied to any part of the tire and will effectually seal it against the escape of air.

The invention consists generally in a tire patch as hereinafter described and particularly pointed out in the claims.

Figure 1:
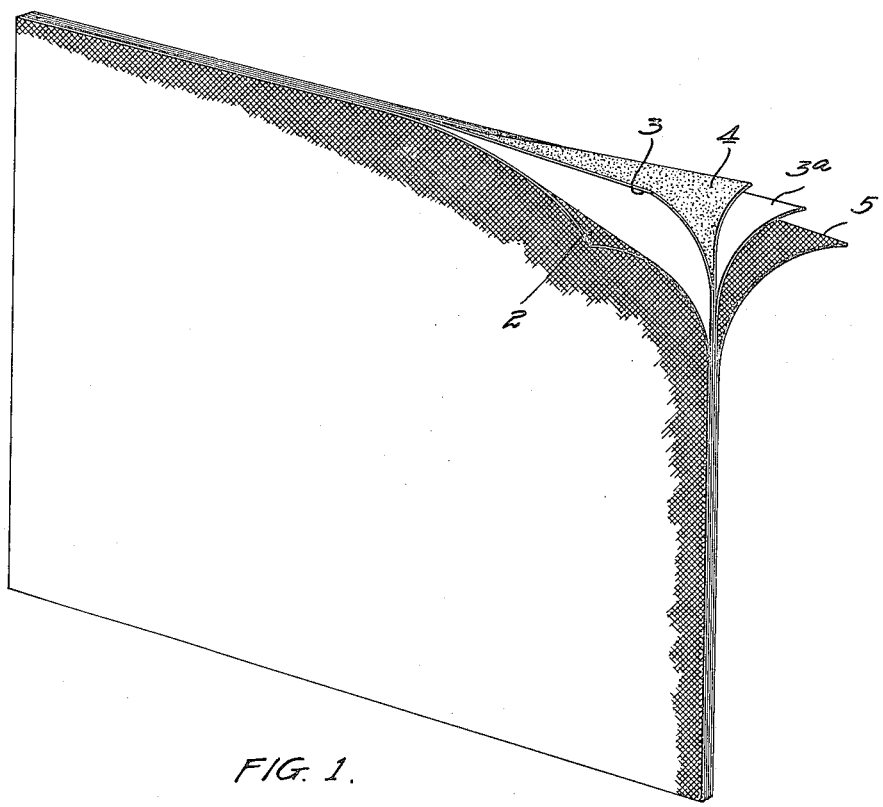
Figure 2:
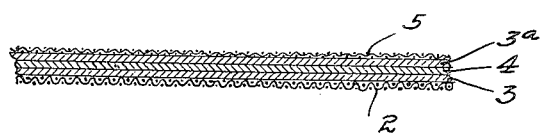

In the accompanying drawings forming part of this specification,

Figure 1 is a perspective view of a tire patch, the layers of which the patch is made up being separated to illustrate the relative arrangement thereof, Fig. 2 is a sectional view through a portion of the patch.

In the drawing, 2 represents a sheet of woven fabric, preferably a suitable grade of canvas, which forms the outer surface of the patch and protects the same. Next to this fabric is a layer 3 of soft or unvulcanized rubber. A similar layer $3^a$ is provided, also of unvulcanized rubber, and between them I place a layer 4 of vulcanized rubber. The function of this latter layer or sheet is to support the layers of raw rubber and hold them in place and prevent the passage of air through the patch when it is stretched over the place in the tire to be repaired. The sheets of raw rubber are soft and yielding, and when stretched might perforate sufficiently to allow the air to escape from the tire, but by interposing the vulcanized sheet between them I am able to positively prevent such escape, the vulcanized sheet forming an imperforate backing for the rubber layers and holding them firmly in place in the patch. The outer face of the raw rubber sheet $3^a$ is provided with a sheet of muslin 5, which normally protects the surface of the raw rubber but can be readily pulled off when the patch is to be used. With this patch the largest blow-out or the smallest puncture can be easily and quickly repaired.

The patch may be made in any suitable size and the thickness of the sheets of vulcanized and unvulcanized rubber may be varied, according to the character of the tire on which the patch is to be used, and in various ways the patch may be modified and still be within the scope of my invention.

By placing the sheet of vulcanized rubber between the sheets of crude rubber instead of next to the fabric, I provide for the outward spreading of the crude rubber and prevent the edges of the patch from cutting the tube. I have also found that the heat produced by friction in driving the car tends to melt the unvulcanized rubber so it will spread out over the vulcanized sheet and cause the sheets 3 and $3^a$ to adhere to one another at the edges of the vulcanized sheet and form a solid protecting sheet between the fabric and the tube.

I claim as my invention:

1. A repair patch for the outer surface of a tire tube comprising a sheet of fabric forming the outer surface of the patch for contact with the shoe, a sheet of raw or unvulcanized rubber adjacent to said fabric, a second sheet of unvulcanized rubber and a sheet of vulcanized rubber interposed between said unvulcanized sheets and forming a backing and support for each sheet and preventing the leakage of air therethrough, one of said unvulcanized sheets having a fabric covering therefor which is removed when the patch is used for contact of such unvulcanized sheet with the surface to be repaired.

2. A tire patch comprising a sheet of fabric forming the outer surface of the patch, a sheet of raw or unvulcanized rubber adjacent to said fabric, a second sheet of unvulcanized rubber, a sheet of vulcanized rubber interposed between said unvulcanized sheets and forming a backing and support therefor, the sheets of raw rubber spreading outwardly over both surfaces of the vulcanized sheet and adhering to one another at the edges of said sheet to form a solid protecting sheet between the fabric and the tube.

3. A repair patch for a textile or rubber surface comprising a sheet of fabric forming the outer surface of the patch and having a covering of raw or uncured rubber for its inner surface, a sheet of vulcanized rubber contacting with said rubber inner surface and sealing it against the passage of air, a covering of raw rubber contacting with the inner face of said vulcanized sheet and closing the joint between the edges of said vulcanized sheet and the surface to be repaired, and a removable fabric adhering to the outer surface of said raw rubber covering.

4. A repair patch for the outer surface of a tire tube comprising a sheet of fabric forming the outer surface of the patch for contact with the shoe, a sheet of vulcanized rubber, means arranged between and securing the sheet of fabric and the sheet of vulcanized rubber together, a sheet of raw or uncured rubber adhering to the inner face of said vulcanized sheet and effectually closing the joint between the edges of said vulcanized sheet and the tube, and a removable fabric adhering to the outer surface of said raw rubber sheet, said raw rubber sheet becoming vulcanized on the tube through the heat produced by the tire shoe on the outer surface of the patch.

In witness whereof, I have hereunto set my hand this 31 day of October 1916.

HARRY C. ATWOOD.

Witnesses:
   W. L. POTTER,
   E. C. PIERCE.